US011933277B2

(12) United States Patent
Nizrad

(10) Patent No.: US 11,933,277 B2
(45) Date of Patent: Mar. 19, 2024

(54) SYSTEMS, APPARATUSES AND METHODS FOR CONVERSION OF KINETIC ENERGY

(71) Applicants: Moshe Nizrad, Petah Tikva (IL); Alon Polad, Ramat Gan (IL); Sarit Romem, Rishon LeTsiyon (IL); Avia Gedalya, Ramat Gan (IL); Ram Michael Muaalam, Beit She'an (IL)

(72) Inventor: Moshe Nizrad, Petah Tikva (IL)

(73) Assignees: Moshe Nizrad, Petah Tikva (IL); Alon Polad, Ramat Gan (IL); Sarit Romem, Rishon LeTsiyon (IL); Avia Gedalya, Ramat Gan (IL); Ram Muaalam, Beit She'an (IL)

( * ) Notice: Subject to any disclaimer, the term of this patent is extended or adjusted under 35 U.S.C. 154(b) by 0 days.

(21) Appl. No.: 18/248,389

(22) PCT Filed: Nov. 15, 2021

(86) PCT No.: PCT/IB2021/060548
§ 371 (c)(1),
(2) Date: Apr. 10, 2023

(87) PCT Pub. No.: WO2022/101869
PCT Pub. Date: May 19, 2022

(65) Prior Publication Data
US 2023/0304473 A1 Sep. 28, 2023

(30) Foreign Application Priority Data

Nov. 15, 2020 (IL) .......................... 278707

(51) Int. Cl.
*F03D 9/00* (2016.01)
*F03D 5/00* (2006.01)
(Continued)

(52) U.S. Cl.
CPC .............. *F03D 9/008* (2013.01); *F03D 5/00* (2013.01); *F03D 9/25* (2016.05); *F15B 1/04* (2013.01);
(Continued)

(58) Field of Classification Search
CPC ... F03D 9/008; F03D 9/25; F03D 5/00; F15B 1/04; H02K 7/1807; F05B 2220/706
See application file for complete search history.

(56) References Cited

U.S. PATENT DOCUMENTS 9,732,724 B1 8/2017 Burke
2007/0297903 A1 12/2007 Morris
(Continued)

*Primary Examiner* — Viet P Nguyen

(57) ABSTRACT

Systems methods and apparatuses for conversion of kinetic energy, which may include: a sail element; a mast; piston device(s) each comprising a piston housing and a piston; movable element(s) connectable to an edge of each piston; and a transmission subsystem movably connectable to the mast and to the moveable element(s). The moveable element (s) and piston(s) are movable along a slopped linear path. Clockwise and/or counterclockwise rotations of the mast, caused by wind, are translatable into linear movements of the moveable element(s) and the piston(s), in a first linear trajectory, where the weight of the moveable element(s) causes opposite linear movement of the moveable element (s) and piston(s) in a second opposite linear trajectory, which causes reciprocal movements of the piston(s) causing fluid pressure by emptying and filling of a fluid therefrom and thereto. The mechanical apparatus can connect to a power generation subsystem, configured for conversion of fluid pressure into electrical power.

18 Claims, 7 Drawing Sheets

(51) Int. Cl.
*F03D 9/25* (2016.01)
*F15B 1/04* (2006.01)
*H02K 7/18* (2006.01)

(52) U.S. Cl.
CPC ...... *H02K 7/1807* (2013.01); *F05B 2220/706* (2013.01)

(56) References Cited

U.S. PATENT DOCUMENTS

| | | |
|---|---|---|
| 2008/0036214 A1 | 2/2008 | Newman |
| 2009/0224553 A1 | 9/2009 | Williams |
| 2011/0088382 A1* | 4/2011 | Berthilsson ............... F03D 5/00 416/41 |
| 2018/0058427 A1 | 3/2018 | Kanno |

* cited by examiner

| PROVIDE A SYSTEM WITH A CONVERSION MECHANISM AND A POWER GENERATION SUBSYSTEM AS DESCRIBED <u>41</u> |

| PUMP FLUID FROM AT LEAST ONE FLUID TANK INTO AT LEAST ONE HYDRAULIC ACCUMULATOR BY CONVERTING WIND AND/OR WAVES KINETIC ENERGY INTO LATERAL MOVEMENTS OF PISTON(S) OF ONE OR MORE PISTON DEVICES OF THE CONVERSION MECHANISM <u>42</u> |

| CONVERT FLUID PRESSURE GENERATED IN HYDRAULIC ACCUMULATOR(S) TO GENERATE ELECTRICAL POWER, BY USE OF A POWER GENERATION SUBSYSTEM, CONFIGURED FOR CONVERSION OF FLUID PRESSURE INTO ELECTRICITY <u>43</u> |

| AUTOMATICALLY/MANUALLY MONITOR AND CONTROL OPERATION OF THE SYSTEM BASED ON DATA FROM ONE OR MORE SENSORS EMBEDDED IN THE SYSTEM AND/OR MANUALLY CONNECTABLE/APPROACHABLE TO THE SYSTEM <u>44</u> |

Fig. 4

SYSTEMS, APPARATUSES AND METHODS FOR CONVERSION OF KINETIC ENERGY

CROSS-REFERENCE TO RELATED APPLICATIONS

This application claims priority from Israeli patent No. IL278707 filed Nov. 15, 2020, entitled "Wind Assisted Electricity Generation System" which is incorporated herein by reference in its entirety.

FIELD OF THE INVENTION

The present disclosure relates in general to systems, apparatuses and methods for clean electricity generation by conversion of kinetic energy including at least conversion of wind energy for generation of electricity.

BACKGROUND

There are three main types of methods/systems for generating clean energy by using conversion of kinetic or solar energy into electrical energy:
(1) wind turbines—used for converting wind kinetic energy by use of turbines rotatable by the wind;
(2) wave energy conversion systems—typically using movable buoys for converting the kinetic energy of sea waves into electrical power; and
(3) solar energy systems—using solar panels with photovoltaic cells to convert solar energy into electrical power.

Wind turbines are very costly to build and are highly sensitive to turbine's blades orientation, dimensions and design, and require posting of the turbines over high supports, which makes it difficult to reach the turbines for repairing or maintenance thereof.

Clean energy systems are dependent on availability and properties of the natural resource for energy it relies on: wind-based and waves-based kinetic energy conversion systems usually cannot generate power in low wind or low waves conditions, whereas solar systems are limited to the hours of direct sunlight during the day reaching its solar panels and cannot generate electric power at night or at dim, foggy or low daylight conditions.

BRIEF DESCRIPTION OF THE FIGURES

The figures illustrate generally, by way of example, but not by way of limitation, various embodiments discussed in the present document.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. References to previously presented elements are implied without necessarily further citing the drawing or description in which they appear. The figures are listed below.

FIG. 2A shows the mechanical apparatus in which pistons of piston devices of the mechanical apparatus are in a full closed state; and FIG. 2B shows the mechanical apparatus in which the pistons of piston devices are in a partial open state, where the pistons are movable reciprocally between the two closed and open states.

FIG. 4 is a flowchart which illustrates a process/method for converting kinetic energy into electrical power, according to some embodiments; FIG. 5A shows the mechanical apparatus in which pistons of piston devices of the mechanical apparatus are in a full closed state; and FIG. 5B shows the mechanical apparatus in which the pistons of piston devices are in a an open state, where the pistons are movable reciprocally between the two closed and open states.

DETAILED DESCRIPTION

Figure 1:
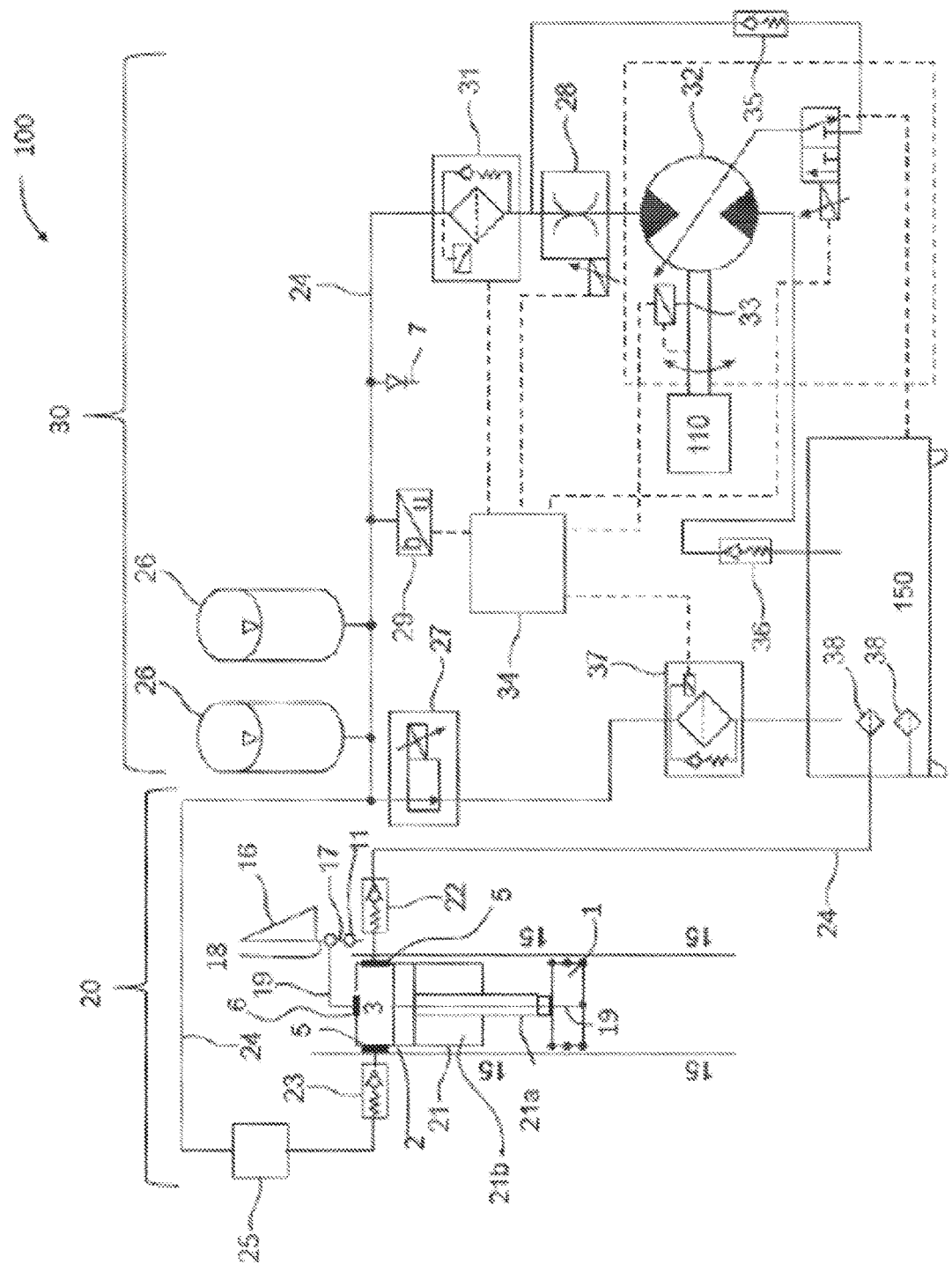
FIG. 1 shows a system for conversion of wind energy to electrical power, according to some embodiments.

Aspects of disclosed embodiments pertain to apparatuses, systems, subsystems and methods for conversion of kinetic energy including at least wind energy for generating electrical power.

Aspects of disclosed embodiments pertain to a mechanical apparatus for conversion of wind and optionally also waves kinetic energy to electrical power, the mechanical apparatus may include, for example, at least:
(i) a sail element;
(ii) a mast connectable to the sail element, defining a main axis "z" about which the sail element and mast are rotatable, such that when the sail element is rotated by wind, it causes rotation of the mast and rotation of the mast rotates the sail element, where the sail and mast are limited to rotate together clockwise and counter-clockwise, about the "z" axis, within a limited rotation span which is smaller than 360 degrees (e.g., allowing rotation of between 0-135 degrees);
(iii) at least one piston device comprising a piston housing and at least one piston;
(iv) at least one movable element (e.g., also serving a weight and/or a buoy) rigidly connectable to an edge of the at least one piston of the at least one piston device; and
(vi) a transmission subsystem movably connectable to the mast at one part/end thereof and to the at least one movable element at another part/end thereof, such that when the mast is rotated by the sail element, the kinetic rotation movement of the mast is transmitted into linear movement of the at least one movable element, thereby causes linear moving of the piston of the at least one piston device connected to the at least one moveable element.

The limited rotation span of the mast and sail element may cause a reciprocal back-and-forth linear movement of the at least one moveable element and therefore reciprocal linear movement of the piston(s) connected thereto for pumping fluid.

According to some embodiments, assuming wind direction is unchanged to a first direction, e.g., pushing the sail element and the mast rotates clockwise direction, the mast will be rotated by the wind up to a maximal rotation angle alpha to pull the moveable element (weight) upwards, against gravity (e.g. by use of a rotatable cable rotated around the mast), until the force applied to the sail and mast by the wind will be lower than the gravitation vector force pulling the moveable element downwards. When the wind is in an opposite direction, pushing the sail element and mast counterclockwise, the cable may still be able to pull the moveable element upwards by wrapping about the mast in the opposite direction. The wind may be moving the cable in a direction that causes the moveable element downwards only within short intervals in which the cable is fully shortened by its wrapping around the mast (or a pulley connected to the mast) and before it reaches its full length by fully unwrapping itself and before being wrapped to an opposite direction.

According to some embodiments, the piston device(s) of the mechanical apparatus may hydraulically connect to a power generation subsystem including, for example, at least one fluid tank (from which fluid is pumped by the piston device(s), one or more hydraulic accumulators, a hydraulic pipeline, one or more motors, one or more generators and pressure control valves. The power generation subsystem may be configured for directing fluids pushed and pulled by the piston device(s) of the mechanical apparatus, to form pressure and/or pressure changes in the one or more hydraulic accumulators, and generation of electrical power by conversion of the fluid pressure generated at the hydraulic accumulator(s) by the mechanical apparatus. The at least one moveable element and at least one piston may be linearly movable along a sloped linear path (e.g., along a straight line) which may be angular to a plain that is perpendicular to a vector of gravitation, such that the at least one moveable element is also moveable in response to gravitational forces applied thereto by its weight, at a second linear trajectory, which is opposite to the first linear trajectory, along the sloped linear path.

The rotation of the mast and sail element may cause a pull (upwardly) or a push (downwardly) of the at least one moveable element in the first linear trajectory and the weight of the at least one moveable element may cause an opposite push (downwardly) or pull (upwardly) of the at least one moveable element in a second opposite linear direction along the linear path, which may ultimately create reciprocal back-and forth movements of the at least one piston connected to the at least one moveable element, for filling and emptying of the piston housing of the at least one piston device, e.g., for creating fluid pressure.

A significant advantage of using a power generation subsystem based on hydraulic pressure, is that the piston(s) and the hydraulic accumulator(s) enable storage of the fluid (such as liquid of high viscosity level such as machine oil) in the accumulator(s) under pressure. When needed, a motor connected to the hydraulic accumulator(s) can be operated based on the stored pressure and controlled pressure release/change from the accumulator(s) for operating a power generator for generation of electrical power by conversion of kinetic (e.g., rotation) energy of the motor into electric current.

The pressure release may be controllable to form a constant or changing rotational speed of a motor drive shaft which can operate the generator in an optimal manner, for power generation.

The methods, apparatuses and systems of the present invention may be used for producing electrical power in a clean non-polluting manner that is beneficial to the sustainability and health of the world's climate and environment. This may also reduce or prevent consumption of fossil fuels and release of endangering greenhouse gases into earth's atmosphere.

The methods, subsystems and systems provided in the following embodiments may also be able to reduce power generation costs and maintenance requirements.

The system may be installable/placeable in various places that enable optimal wind exposure and may not necessarily require using a high support post (such as being used for wind turbines).

The systems, apparatuses, subsystems, and methods of the present invention, according to some embodiments thereof, may also be used to enable kinetic energy conversion of both wind and wave motion and be placed over breakwaters, rooftops, ship decks, etc. allowing engagement of the at least one moveable element (which may be made of buoy material) or a buoy element connected thereto with water such as sea/lake water for being movable also by the waves.

The term "sail element" used herein may refer to any device, element and/or apparatus of any dimensions and shape that has a surface area for catching wind.

The term "sail element" and "sail" may be used interchangeably herein.

The term "mast" used herein may refer to any structure such as, yet not limited to an elongated support, which can be rigidly and/or removably attached to the sail element.

The term "cable" used herein may refer to any type of a flexible rope, band, strap, strip, cord, wire, chain, hawser etc. made of any material(s) allowing pulling or towing elements.

According to some embodiments, the at least one piston and/or the at least one piston housing of the at least one piston device, may be made from a metallic alloy, iron, steel, resin, epoxy resin, plastic, polymeric material(s), stainless steel, etc.

The systems, methods and apparatuses of the present invention may be configured to be operated based on hydraulic pressure by using liquid fluid(s) or on pneumatic pressure by using gas fluid(s).

According to some embodiments, the mechanical apparatus and/or the system may be designed for being stationary and fixated to a specific location and/or be configured to allow mobilizing the apparatus and/or the system from place to place and optionally for being stationed (in a permanent or removable manner) to a portable/mobile/transportable vehicle.

Aspects of embodiments pertain to a mechanical apparatus for conversion of kinetic energy, that may not necessarily include the mast and sail element but can moveably connect to a mast connected to a sail element. For example the mechanical apparatus may include:

at least one piston device comprising a piston housing and at least one piston, linearly movable inside the piston housing;

at least one movable element connectable to an edge of the at least one piston of the at least one piston device, the at least one moveable element serving as a movable weight; and a transmission subsystem movably connectable, at one part thereof to a mast, which is connected to a sail element, and at another part thereof to the at least one movable element, such that rotations of the mast are translatable by the transmission subsystem into reciprocal back and forth movements of the at least one moveable element along a linear path.

Reference is now made to FIG. 1, schematically illustrating a system 100 for conversion of at least wind kinetic energy into electrical power (electricity generation), according to some embodiments.

The system 100 may include:
(i) a mechanical apparatus 20 for using wind energy to generate linear reciprocal back-and-forth movement of one or more pistons for generation of fluid pressure changes, where the mechanical apparatus 20 is based on movement of a sail 16, which can be rotatable by wind; and
(ii) a power generation subsystem 30 for using fluid pressure and/or changes in fluid pressure, generated by the mechanical apparatus 20, in order to generate electrical power.

According to some embodiments, the mechanical apparatus 20 may include:
a sail 16;
a mast 18 connected to the sail 16, such that the sail 16 and mast 18 can rotate together around the same rotation axis, once wind hits the sail 16;
a piston device 21 comprising a piston 21a and a piston housing 21b in which the piston can linearly move;
a transmission subsystem comprising a cable 19 wrapped around the mast 18 or around a sheave 17 connected to the mast 18 such that the sheave 11 is rotated by the rotation of the mast 18, wrapping and unwrapping the cable 19 around the sheave 17 or mast 18 in response to back-and-forth rotation of the mast 18;
a moveable element 1 connected to one end of the cable 19, such that the movable element 1 can be pushed and pulled by the cable 19 based on sail 16 and mast 18 rotation. The moveable element 1 may be connected to an edge of the piston 21a, at another end thereof, such that when the moveable element 1 is pushed or pulled by the cable 19 in response to the rotation movements of the sail 16, the moveable element 1 linearly pushes and pulls (linearly moves back and forth) the piston 21a inwardly and outwardly from the piston housing 21b.

The sheave 17 rotates in response to rotation of the mast 18 in any direction (clockwise or counterclockwise in respect to the rotation axis of the sheave 17) and therefore will pull the moveable element 1 upwards whenever the sail element 16 and mast 18 are rotated, whether clockwise or counterclockwise (in respect to the mast 18 rotation axis). The rotation of the sheave 17 will therefore shorten the overall distance of the cable 19 stretched between the moveable element 1 and the sheave 17/mast 18 regardless of the sheave's rotation direction. The pulling of the moveable element 1 e.g., upwards, will cause pulling of the piston 21a upwards, since they are attached to one another. This will cause suction of fluid by the piston device 21 to be partially or fully filled reaching a partial or a full open position (depending on the pull force applied which depends on the wind strength|), while the weight of the moveable element 1 retrieves/retracts the moveable element 1, and the piston 21a to which it connects downwards, to a full/partial closed position, fully/partially emptying the piston housing 21b e.g., for directing the fluid in the piston housing 21b towards one or more fluid accumulators. This mechanism may enable continuous back-and-forth movement of the piston 21a and therefore continuous suction and emptying of the piston housing 21b by the piston 21a as long as wind is applied to the sail element 16.

The piston device 21 may hydraulically connect to a fluid tank 150 (of the power generation subsystem 30) e.g., via a branched pipeline 24, for suction of fluid such as machine oil therefrom into and out of the piston device 21 and also hydraulically connect to hydraulic accumulator(s) 26 of the power generation subsystem 30 such that the fluid pumped from the fluid tank 150 by the piston device 21 can be directed into the hydraulic accumulator(s) 26.

Each hydraulic accumulator 26 may be a pressure storage reservoir, configured to hold therein, under pressure, incompressible hydraulic fluid (gas or liquid), where the pressure is continuously applied by the piston device 21 when the sail 16 is rotated by wind.

According to some embodiments, the moveable element 1 may be also used as a weight such that when the sail 16 is moved to one direction (e.g., clockwise) it pulls upwards the moveable element 1 acting against gravity and when the sail element 16 is rotated in an opposite direction (e.g., counterclockwise) gravitation is added (superimposed) to the pushing force applied by the sail element 16 via the mast 18 and cable 19. This, along with the limited rotation span of the sail element 16 and mast 18, may enhance the speed of reciprocal back-and-forth movement of the moveable element 1 as it may retrieve the moveable element 1 to a lower position in which the cable 19 is in full stretch and therefore may enhance movement of the piston 21a connected to the moveable element 1 and the forces applied by the piston 21a for pumping the fluid from the fluid tank 150, increasing thereby power production efficiency.

According to some embodiments, as shown in FIG. 1, the mechanical apparatus 20 may further include a stationary unit 2 having or forming one or more tracks such as track 15 along/inside which the moveable element 1 can move, for preventing the moveable element 1 from swinging in undesired directions by restricting its moving path.

The cable 19 may be connected to a center and/or a center of mass of the moveable element 1.

The piston 21a may connect at one end thereof to the moveable element 1 such that the mass of the moveable element 1 is symmetrically distributed about a main axis of the piston 21a which aligns with the linear movement of the moveable element 1.

The track 15 may be sloped in respect to a horizontal axis "x" which is perpendicular to "z", where axis "z" may be aligned/parallel to gravity, where the slope forms a non-zero angle with the horizontal axis "x". the slope angle may be between 0-90 degrees or equal to 90 degrees (in which case the track 15 is parallel to gravity.

According to some embodiments, the stationary unit 2 may further include a barrier member 3, which may be located at an upper side of the track 15, for preventing the piston 21a or the piston device 21 from exceeding an upper threshold position.

According to some embodiments, the track 15 may include also one or more grooves, for further restricting movement of the piston device 21 in undesired directions for preventing the piston 21a rom deviating from the single linear path it is aimed to move along back and forth.

According to some embodiments, the stationary unit 2 may include one or more openings 5 for allowing the piston device 21 to hydraulically connect to hydraulic pipes of a pipeline 24 connecting the piston device 21 to the power generation subsystem 30 such as for connecting the piston device 21 to the fluid tank 150 and/or to the hydraulic accumulator(s) 26.

According to some embodiments, the power generation subsystem 30 may include at least:

a fluid tank 150;
one or more hydraulic accumulators 26;
a hydraulic pipeline 24, which can be branched as a manifold pipeline having branches of pipe flowingly (hydraulically) connected thereto integrally or by means of pipeline connectors;
a motor 32; and
a generator 110 operatively associated with the motor 32 such that the motor 32 rotates in response to changes in hydraulic pressure in the hydraulic accumulator(s) 26, and the generator 110 is configured to convert motor 32 element(s) rotations into electrical power/current.

According to some embodiments, the motor 32 may be a vane, gear, or radial piston hydraulic motor.

The fluid (e.g., oil) in the hydraulic accumulator(s) 26 may be kept under pressure by having the piston device 21, operated by the conversion of wind energy into linear reciprocal movement of its piston 21a, for pumping (sucking) fluid from the fluid tank 150 through the pipeline 24 into the hydraulic accumulator(s) 26. The fluid from the hydraulic accumulator(s) 26 is directed, due to the pressure accumulated therein, towards the motor 32, for operating the generator 110 thereby.

According to some embodiments, the motor 32 may be a hydraulic motor using, for example, a lubrication subsystem that utilizes the pressured fluid from the accumulator(s) 26, where the fluid being used in the system 100 is a lubrication liquid such as lubrication oil.

According to some embodiments, the system 100 further includes one or more valves that can be used for adjusting, regulating and/or controlling fluid flow through the pipeline. For example, as shown in FIG. 1, the system may further include one or more of:

two charging valves 22 and 23 one valve 22 located in a pipeline branch between the piston device 21 and the fluid tank 150 and the other valve 23, located in a pipeline branch between the piston device 21 and the hydraulic accumulator(s) 26;
a first non-return (check) valve 36 located between the fluid tank 150 and the motor 32 and/or a second non-return valve 35 located between the controller 34 and the pipeline section that is located between valve 28 and filter 31 also connected to the motor 32;
a controllable valve 28 located and configured to control/regulate pressure of fluid entering the motor 32 from the hydraulic accumulator(s) 26.

The power generation subsystem 30 may also include one or more connectors located at one or more test points, such as a nipple connector 7, for manual reading of pressure at one or more locations over the pipeline 24. The test connecting point of connector 7 is between the hydraulic accumulator(s) 26 and a fluid filter 31 located and configured to filter fluid arriving from the accumulator(s) 26 to the motor 32.

According to some embodiments, the controller 34 may include and/or use any one or more hardware devices and/or software modules and may also use remotely located devices such as for retrieving information from remote database(s) and/or remote processing of data.

According to some embodiments, the power generation subsystem 30 may further include another filter 37 located and configured to filter fluid that is returned to the fluid tank 150.

According to some embodiments, the power generation subsystem 30 may further include one or more of:
at least one sensor located and configured to sense one or more characteristics of the at least one motor 32 and/or the at least one generator 110 such as a speed sensor 33 (e.g., wheel speed sensor (WWS)) for sensing speed of the motor's wheel/shaft, a thermometer (temperature sensor); and
a control unit 34 configured to automatically and/or manually monitor and control one or more components of the system 100, e.g., based on sensor data analysis automatically and/or manually received from the one or more sensors of the system 100.

According to some embodiments, the one or more sensors of the system 100 may further include at least one pressure detector such as pressure detector 29 located and configured for measuring pressure between the at least one accumulator and the motor also including a transmitter for transmitting data indicative of measured pressure.

According to some embodiments the system 100 may further include one or more thermal regulators and/or a cooling subsystem (not shown), for preventing parts/devices/components of the system 100 such as from the pipeline 24, the generator 110, the motor 32 etc., from overheating.

According to some embodiments, one or more parts/components of the system 100 such as the pipeline 24 may be made from pressure and/or heat resisting materials to withstand high pressure and/or high temperatures of the fluid flowing therethrough.

According to some embodiments, the cable 19 that connects to the moveable element 1 at one end/edge thereof continues along the track 15 and passes through e.g., an opening 6 in the barrier member 3 of the stationary unit 2. The maximal width or diameter of the opening 6 may range between 2-10 cm—e.g., 5 cm.

According to some embodiments, the lower part of the mast 18 is supported in a rotatable manner by a bearings unit 17. The mast 18 enters into an inner ring formed by a bearings housing (not shown) of the bearings unit 11, holding therein at least two bearings. The diameter of the mast (at least at its lower edge) may be exactly the same as or slightly smaller than the diameter of the inner ring of the bearings unit.

According to some embodiments, the bearings unit 11 may include a support structure (such as a circular base with a ring rim integrally connecting to one another) and one or more rings coaxially and spatially arranged in respect to one another, where one ring may be welded/rigidly attached to a lower part of the mast 18 and may be rotatable inside the support structure (not shown) within a grooved recess located at an inner side of the bearings unit's 11 base structure. A lower part of one or more of the rings may include ball bearings or wheels rotating inside a rail formed by the grooved recess.

The rings may be up to 50 cm apart from each other.

The width and/or diameter of the circular grooved recess may be equal or approximated to a width of the rime of the ring and/or equal or approximated to the diameter of an outer ring of a bearings unit 11.

According to some embodiments, the base structure of the bearings unit 11 may be dug/created at a base/ground of a station or platform over which the mast 18 is to be installed or placed inside a designated hole of fitting dimensions to fixate the mast 18 to the ground/base and enable optimal support to the weight of the sail element 16 and mast 18. The mast 18 may be located at a distance of up to ten meters from the moveable element 1 and stationary unit 2. The mast 18 may be inserted into the pit/hole/base structure when an outer ring of an upper bearing is at the height of the ground/platform, the base structure may be a portable container and/or attachable to a platform which may be portable and/or floatable.

According to some embodiments, above the upper bearing ring that is located at the height of the platform surface, a sheave such as a pulley 11 may be connected to the mast 18, where the inner ring of the pulley 11 may be welded to the mast 18.

The pulley 11 may consist of a wheel with protruding rims on both sides thereof, forming a groove between the protruding rims, for providing a grip to the cable 19 inside the groove.

When the piston 21a is in an open position, the cable 19 is stretched and protrudes from the center of the front wall of the stationary unit 2. The cable 19 may continue to pass over/through a vertical pulley (not shown) and may connect/directly to the mast 18 through an opening in the outer ring of the horizontal pulley 11 that may be welded to the mast 18. The cable may be tied/knotted between the two sides of the pulley 11

Above the pulley 11 that is welded to the mast 18 an axel may be installed, the axel connecting the mast 18 to a sail boom (not shown) that may be used.

According to some embodiments, a front rim of the sail element 16 may be tied/attached to the sail boom and reach a vertex of the sail element 16 (at an upper corner of the sail element 16). A lower lip of the sail element 16 may be tied/attached to the axel and stretched to the corner of the sail element 16 (at a lower rear corner of the sail element 16).

The piston 21a, attached to moveable element 1, may be pushed into the hydraulic piston device 21, in response to the rotation of the sail element 16 and mast 18.

Wind that blows over the sail element 16, rotates the sail element 16 in the direction of an angle range of 0 to 135 degrees. The mast 18, fixedly connected to the sail element 16, rotates in response to and together with the rotation of the sail element 16, and thereby rotates the horizontal pulley 11 attached thereto. The horizontal pulley 11, attached to the mast 18, rotates along with the mast 18 and thereby pulls the cable 19 and the moveable element 1 upwards.

The track 15 allows the moveable element 1 pulled by the cable 19, to move along the track 15 in a linear movement, thereby pulls the piston 21a in the same linear upward trajectory.

The cable 19 may be located in a circular groove formed by the between the two opposite protruding rims of the pulley 11.

When the piston 21a is being pulled upwards, from an open position to a closed position, fluid can be pushed/pumped through the charging valve 23 and through the hydraulic pipeline 24 and optionally through one or more additional valves, into the hydraulic accumulator(s) 26.

The fluid (e.g., oil) stored in the hydraulic accumulator(s) 26 is directed to the motor 32 and rotates a drive shaft of the motor 32.

The fluid, once passing the motor 32 for rotating its drive shaft, is further directed by the pipeline 24 from the motor 32 to the fluid tank 150.

The motor 32 shaft may drive a generator-shaft of the generator 110, which is connected to the electrical grid or to any other electrical system/machine.

When the angle of the sail element 16 reaches the value at which the force exerted by the wind over the sail element 16 is smaller than the force (gravity) of the moveable element 1, the moveable element descends (pulled down by gravity along the track 15 and pulls the cable 19, which rotates the mast 18 (with the help of the bearings) and the sail element 16 in opposite direction to the wind direction, retracting the mast 18 and sail element 16.

According to some embodiments, the generator 110 may be connectable to a general electrical grid, and/or to one or more energy storage system(s)/device(s) such as to one or more batteries such as one or more lithium batteries for energy storage.

The retraction of the moveable element 1 (down the track 15 which may be parallel or less than 90 degrees in respect to the gravity force) may also pull the piston 21a out of the piston housing 21b to an open position allowing the hydraulic piston device 21 to pump hydraulic fluid (e.g., oil) from the fluid tank 150 through the pipeline 24 section hydraulically connecting the fluid tank 150 and the piston device 21 e.g., via one or more valves.

The mechanical apparatus 20 according to the above and below described design(s) and embodiments, allows the sail element 16 to reciprocally rotate back and forth between 0-135 degrees or much less in a continuous manner.

According to some embodiments, when the sail element 16 reaches a rotation span of 90 degrees it pulls about a third of the maximal span Dmax of the piston 21a, where the maximal span Dmax is reached when the piston 21a is at a full opened position. Therefore, the full span Dmax reaches (under high wind conditions) its maximal rotation span of 135 degrees. This allows continuous rotation of the sail element 16 in low and high wind conditions (as long as wind is blowing), and therefore allows continuous and optionally also steady and even rotation speed of the generator 110 for continuous and steady electricity generation.

According to some embodiments, the controller 34 may be using a closed-circuit system.

According to some embodiments, the system 100 may be connectable to a switch or a switching apparatus allowing shifting the electricity system from using the system 100 to using the usual electricity grid and vice versa.

Figure 2A:
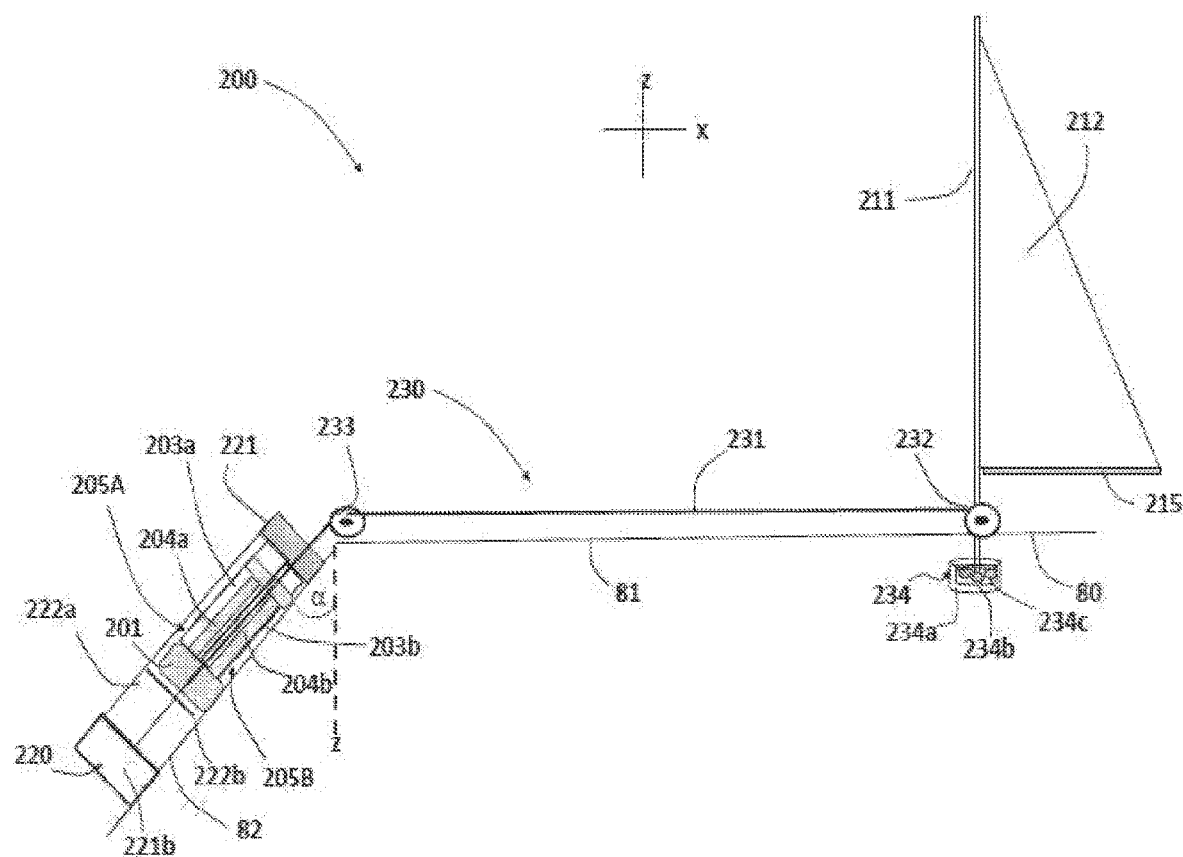
FIGS. 2A and 2B show a mechanical apparatus for conversion of kinetic energy, according to some embodiments, in which pistons of piston devices of the mechanical apparatus are to be pushed downwardly, along a lateral or a linear sloped path, for filling of the piston devices and pulled upwardly for emptying of the piston devices along the linear sloped path.
Figure 2B:
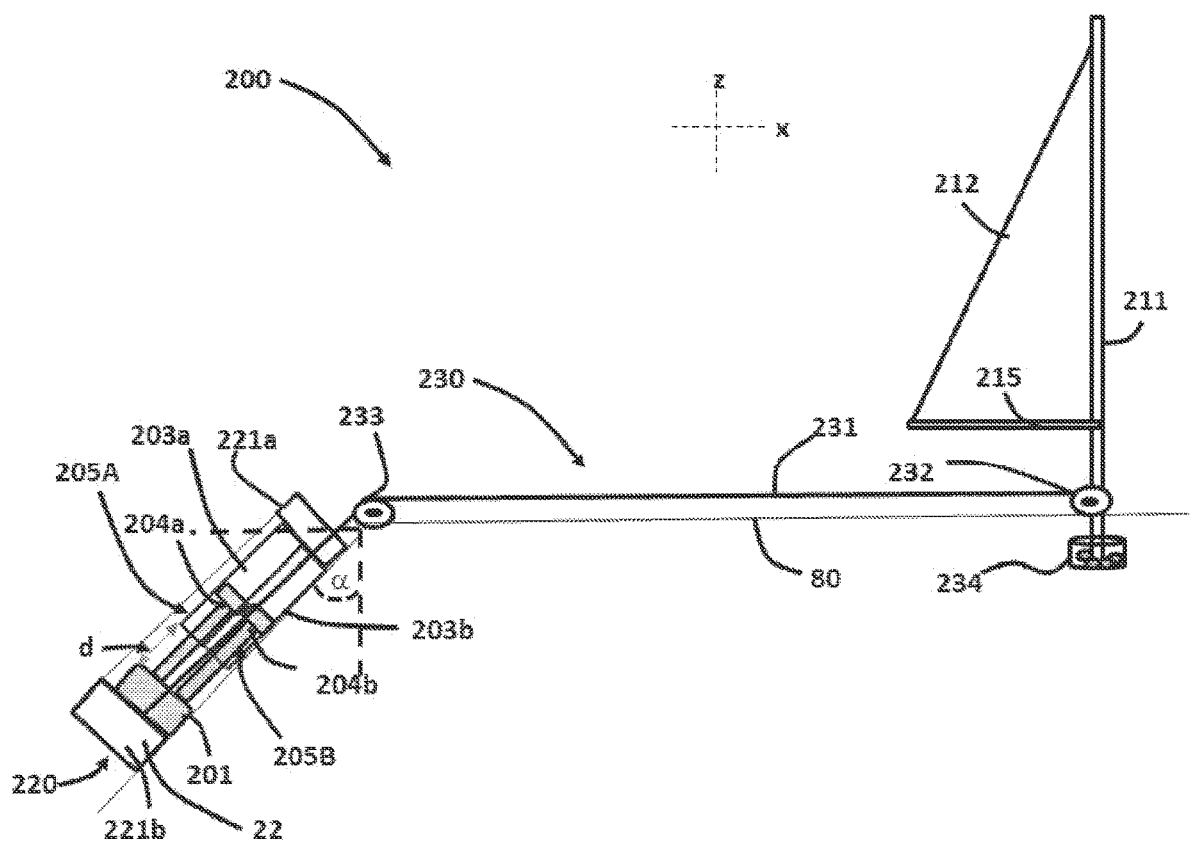

Reference is now made to FIGS. 2A and 2B, schematically illustrating a mechanical apparatus 200, for using wind energy to operate multiple piton devices such as piston devices 205A and 205B for pumping fluid such as oil, according to some embodiments, where FIG. 2A shows the mechanical apparatus 200 when the pistons 204a and 204b are in a fully closed position (fully inserted into their respective piston housings 203a and 203b); and FIG. 2B shows the mechanical apparatus 200 when the pistons 204a and 204b are in a partial open position (pulled upwardly along a sloped linear path to a partial length span d from their respective piston housings 203a and 203b).

As shown in FIGS. 2A and 2B, the mechanical apparatus 200 may include:
  a sail element 212;
  a mast 211 connected to the sail element 212, such that the sail element 212 and mast 211 can rotate together around the same rotation axis "z", once wind hits the sail element 212;
  a first piston device 205A comprising a piston 204a and a piston housing 203a in which the piston 204a can linearly move;
  a second piston device 205B comprising a piston 204b and a piston housing 203b in which the piston 204b can linearly move;
  a bearings unit 234 for rotatably supporting the mast 211 e.g., having multiple bearings and a bearings support, such as one or more support rings;
  a transmission subsystem 230 comprising a cable 231 wrapped around the mast 211 or via a first sheave 232 connected to the mast 211 and a second sheave 233, such that the sheaves 232,233 are rotated by the rotation of the mast 211, for pulling and pushing of the cable 231, in response to back-and-forth rotation of the mast 211 caused in response to back-and-forth reciprocal rotation of the sail element 212; and a moveable element 201 connected to one end of the cable 231, such that the movable element 201 can be pushed and pulled by the cable 231 based on sail 212 and mast 211 rotation and the weight applied by the moveable element 201.

The moveable element 201 may be connected to lower edges of the pistons 204a and 204b, at an upper edge/end thereof, such that when the moveable element 1 is pushed or pulled by the cable 231 in response to the rotation movements of the sail element 212, the moveable element 201 linearly pushes and pulls the pistons 204a and 204b inwardly and outwardly from their piston housings 203a and 203b.

a stationary unit 220 which may include:

grooved tracks 222a and 222b one for limiting/preventing sideway movement of each of the piston devices 205A and 205B respectively, for restricting the pistons 204a and 204b movement to a linear movement along its respective single linear path each, along its respective track groove; and an upper barrier element 221a and a lower barrier element 221b for limiting piston devices 205A, 205B upward and downward movement along the tracks 222a and 222b.

According to some embodiments, the stationary unit 220 may be positioned in a slope, forming an angle α (alpha) in respect to a "z" axis which is parallel to the gravitational force, where axis "z" is perpendicular to a horizontal axis "x", e.g. where the stationary unit 220 is supported by a base 80 having a sloped base part 82 sloping from a horizontal base part 81 which may support the mast 211 and bearings unit 234.

The angle α between the sloped base 82 and the "z" axis, may be less than 90 degrees in respect to the "z" axis or parallel to the "z" axis (which is a parallel to gravity), to act at full extent over the moveable element 201 for retrieving/retracting it back to a full or partial downward state). The slope angle α may be preferably at a sharp angle that is less than 45 degrees.

In some embodiments, in which the angle α is zero degrees, the full gravitational force is applied to the moveable element 201.

According to some embodiments, when the pistons 204a and 204b are at an open position they form a distance d between the lower edge of the piston housings 203a and 203b and an upper edge of the moveable element 201 allowing filling of the piston housings 203a and 203b.

Similarly to the mechanical apparatus 20 described in respect to FIG. 1, the back-and-forth rotation span of the sail element 212 and the mast 211 to which the sail element 211 connects, may be less than 360 degrees or between 0-270 degrees (135 at each direction: clockwise/counterclockwise).

According to some embodiments, the sail element 212 may be connected at a lower side thereof to a sail boom 215 for further stabilizing the sail element 212.

The moveable element 201 connects at an upper edge thereof to lower edges of the pistons 204a and 204b such that when the sail element 212 and mast 211 rotate about their rotation axis (which may be parallel to the gravity "z" axis), clockwise or counterclockwise, the moveable element 201 is pulled upwards pulling the pistons 204a and 204b such as to empty their respective piston housings 203a and 203b.

Due to the sloped positioning of the piston devices 205A and 205B and the moveable element 201, the weight of the moveable element 201 (and the weight of the pistons 204a and 204b) is pushed by gravity down the slope pushing the pistons 204a and 204b along with it in a linear downward trajectory.

According to some embodiments, the pulley sheave 232, attached to a lower part of the mast 211, will rotate back and forth to shorten the cable 231 in response to respective back and forth rotation of the mast 211, when the apparatus 200 is under wind condition, causing the pulling of the moveable element 201 and the pistons 204a and 204b attached thereto for emptying of the piston devices 205A and 205B.

According to some embodiments, the bearings unit 234 may include a support structure 234 such as a ring-shaped structure with a bottom seal part, an inner ring 234b and multiple ball bearings 234c located inside the inner ring 234b in a rotatable and/or movable manner, for supporting the mast 211 in an upright position while allowing it to rotate inside the inner ring 234b.

Figure 3:
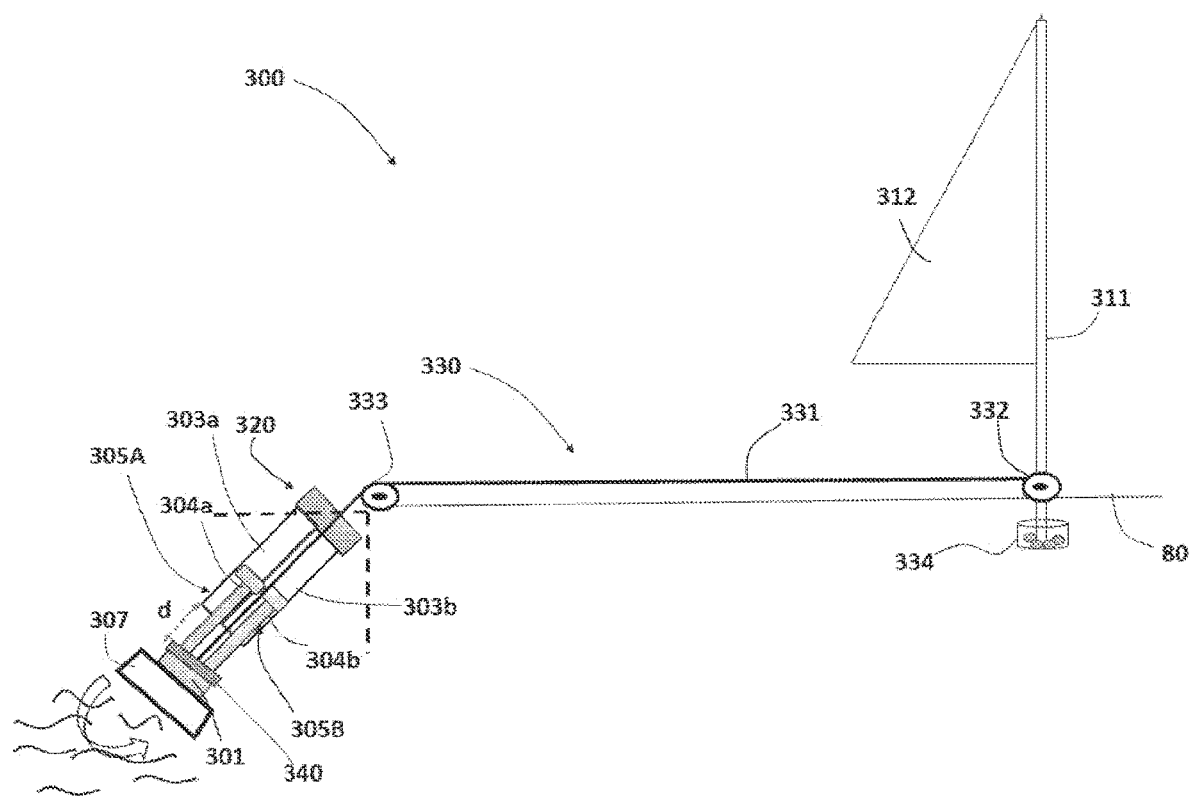
FIG. 3 shows a mechanical apparatus for conversion of both wind and waves kinetic energy, according to other embodiments.

Reference is now made to FIG. 3, schematically illustrating a mechanical apparatus 300 for using wind and waves energy to operate multiple piton devices such as piston devices 305A and 305B for pumping fluid such as oil, according to some embodiments.

As shown in FIG. 3, the mechanical apparatus 300 may include:

a sail element 312;

a mast 311 connected to the sail element 312, such that the sail element 312 and mast 311 can rotate together around the same rotation axis "z", once wind hits the sail element 312;

a first piston device 305A comprising a piston 304a and a piston housing 303a in which the piston 304a can linearly move;

a second piston device 305B comprising a piston 304b and a piston housing 303b in which the piston 304b can linearly move;

a bearings unit 334 for rotatably supporting the mast 311 e.g., having multiple bearings and a bearings support, such as one or more support rings;

a transmission subsystem 330 comprising a cable 331 wrapped around the mast 311 or via a first sheave 332 connected to the mast 311 and a second sheave 233, such that the sheaves 332,333 are rotated by the rotation of the mast 311, for pulling and pushing of the cable 331, in response to back-and-forth rotation of the mast 311 caused in response to back-and-forth reciprocal rotation of the sail element 312; and a moveable element 201 connected to one end of the cable 331, such that the movable element 301 can be pushed and pulled by the cable 331 based on sail element 312 and mast 311 rotation and the weight applied by the moveable element 301. The moveable element 301 may be connected to lower edges of the pistons 304a and 304b, at a lower end thereof, such that when the moveable element 301 is pushed or pulled by the cable 331 in response to the rotation movements of the sail element 312, the moveable element 301 linearly pushes and pulls the pistons 304a and 304b inwardly and outwardly from their piston housings 303a and 303b; and a stationary unit 220 configured at least to support the piston housings 303a and 303b to be positioned in a sloped manner in respect to horizontal axis "x" and or in respect to vertical axis "z".

The moveable element 301 may be embedded in or attached to a buoy element 307 enabling floating over water, for having the moveable element 301 also moveably responsive to waves for also enabling linearly moving of the pistons 304a and 304b in response to waves engaging/hitting the buoy element 307 which the movable element 301 is attached to or embedded/placed in. This may require the transmission subsystem 230 to include one or more additional means for translating waves motion lifting and lowering the moveable element 301 in various angles in respect to the vertical and horizontal axes "z" and "x" to maintaining the single-trajectory linear movement of the pistons 304a and 304b. For example the moveable element may be connected to the lower edges of the pistons 304a and 304b via a bearings or gear system translating upward and downward movements of a rigid arm connecting to the moveable element 301 and buoy element 307 at a lower edge thereof and moveably connected to the pistons 304a and 304b via one or more hinges and/or a gear system 340 (e.g. comprising at least one cogwheel and a gear comb) configured and positioned for translating rotational/pivotal movement of the rigid arm into a linear movement of the pistons 304a and 304b.

Reference is now made to FIG. 4, showing a flowchart schematically illustrating a process for conversions of kinetic energy e.g., using one of the mechanical apparatuses as described above. The method/process may include:
  providing a system with a mechanical apparatus configured to translate rotational movements of a mast and a sail element thereof rotatable by wind and optionally also by waves kinetic energy, to linear reciprocal back-and-forth movements of one or more pistons of one or more piston devices and a power generation subsystem configured for conversion of fluid pressure into electricity (e.g., according to embodiments as described above) 41;
  pumping fluid from at least one fluid tank of the power generation subsystem into at least one hydraulic accumulator by converting wind and/or waves kinetic energy into linear movements of piston(s) of one or more piston devices of the mechanical apparatus 42;
  converting fluid pressure (and/or changes in fluid pressure) generated in hydraulic accumulator(s) of the power generation subsystem, to generate electrical power 43; and
  (optional) automatically and/or manually monitoring and controlling operation of the system based on data from one or more sensors embedded in the system and/or manually connectable/approachable to the system.

According to some embodiments, the linear movement of the piston(s), in response to rotational movements of the mast and sail element is enabled by using at least one moveable element connected to an edge of each piston, where the at least one moveable element is moveably connected to a transmission subsystem of the mechanical apparatus configured and positioned to enable linear movement of the moveable element(s) in response to rotation movement of the sail element and mast.

Figure 5A:
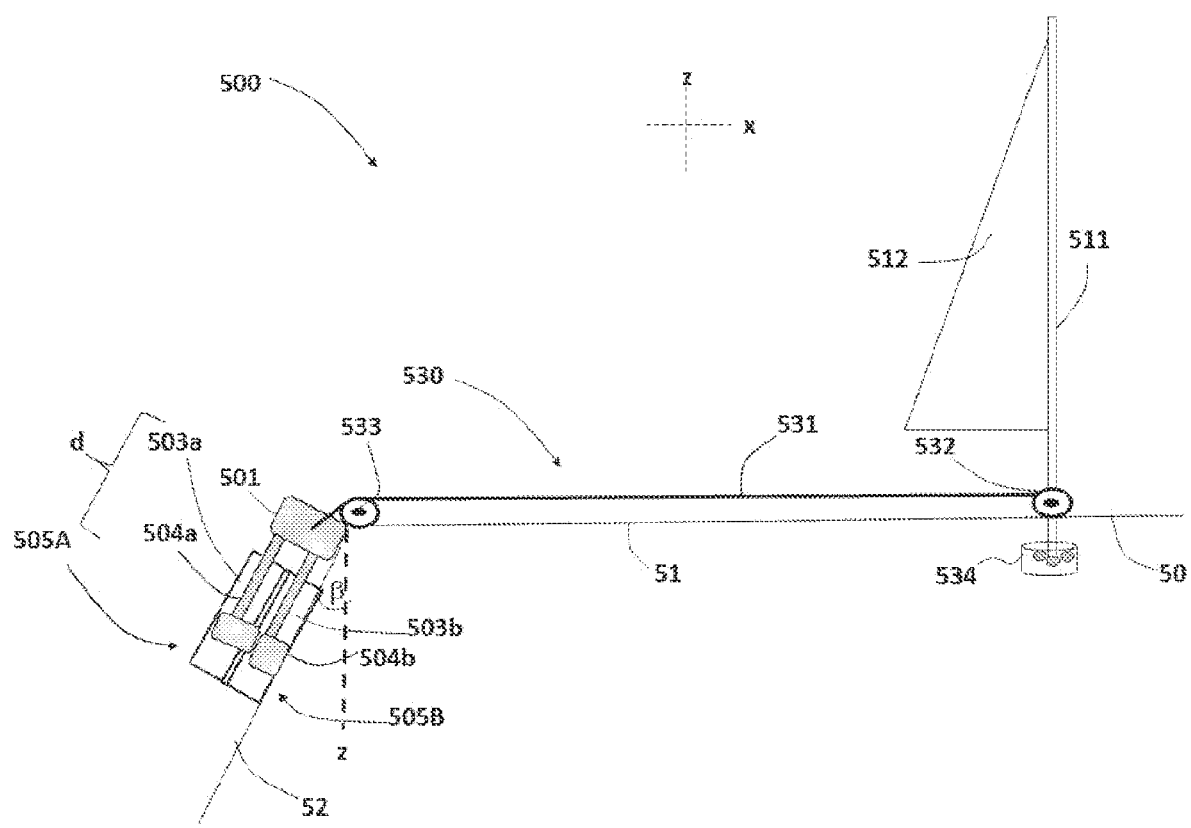
FIGS. 5A and 5B show a mechanical apparatus for conversion of kinetic energy, according to other embodiments, in which pistons of piston devices of the mechanical apparatus are to be pushed downwardly, along a linear sloped trajectory, for emptying of the piston devices and pulled upwardly for filling of the piston devices along the linear sloped trajectory.
Figure 5B:
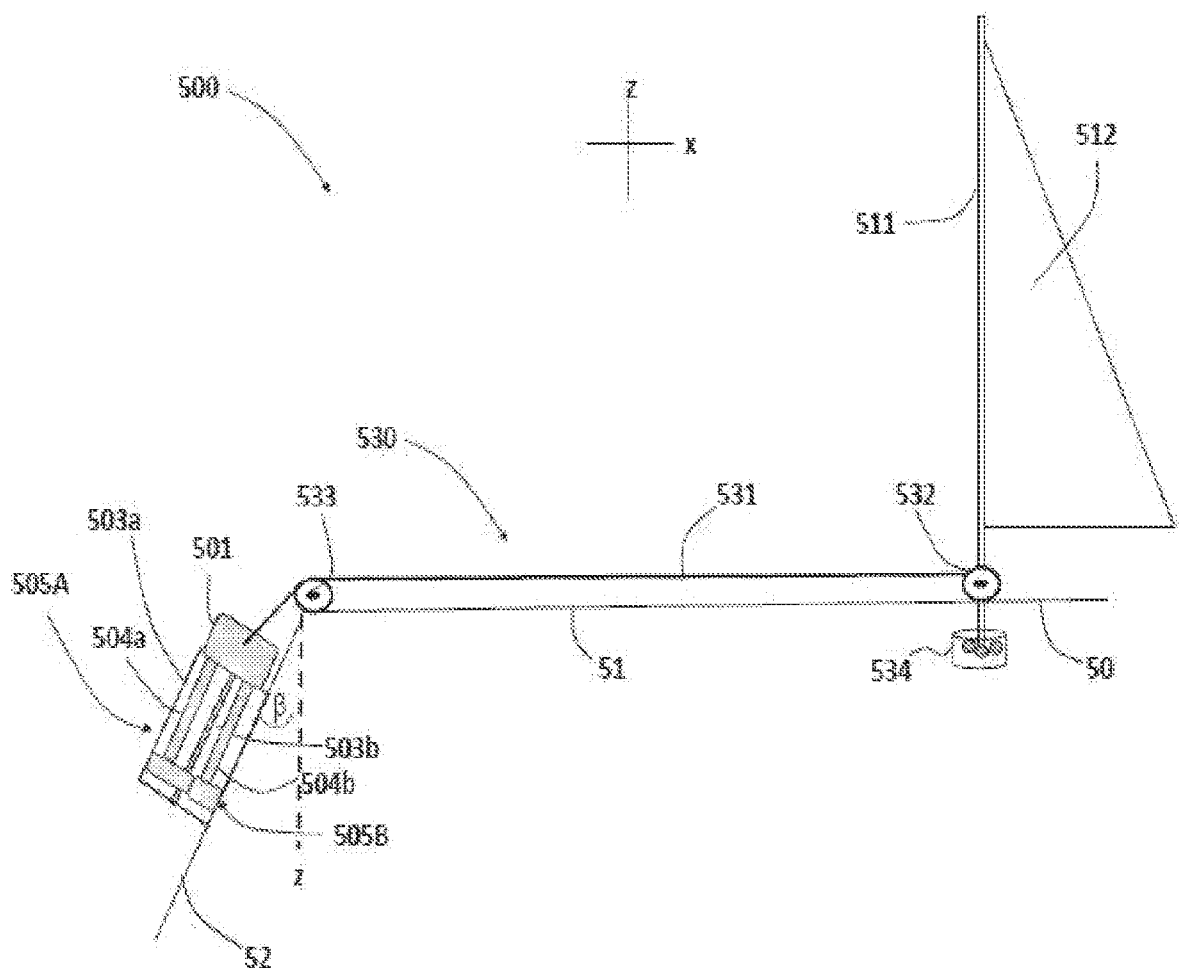

Reference is now made to FIGS. 5A and 5B, schematically illustrating a mechanical apparatus 500, for using wind energy to operate multiple piton devices such as piston devices 505A and 505B for pumping fluid such as oil, according to some embodiments, in which piston devices 505A and 505B of the apparatus 500 are positioned in a reversed position to the piston devices 205A and 205B and a moveable element 501 is located above the piston devices 505A and 505B.

FIG. 5A shows the mechanical apparatus 500 when the pistons 504a and 504b are in a partial open position, in which the pistons 504a and 504b are partially pulled out from their respective piston housings 503a and 503b, and FIG. 5B due to upward linear movement of the moveable element 501 caused by clockwise and/or counterclockwise rotation of the mast 511; and FIG. 5B shows the mechanical apparatus 500 when the pistons 504a and 2504b are in a closed position in which the pistons 504a and 504b are fully inserted in their respective piston housings 503a and 503b due to downward linear movement of the moveable element 501, caused by gravitational forces applied to the moveable element 501 serving as a weight.

As shown in FIGS. 5A and 5B, the mechanical apparatus 500 may include:
  a sail element 512;
  a mast 511 connected to the sail element 512, such that the sail element 512 and mast 511 can rotate together around the same rotation axis "z", once wind hits the sail element 512;
  a first piston device 505A comprising a piston 504a and a piston housing 503a in which the piston 204a can linearly move;
  a second piston device 505B comprising a piston 504b and a piston housing 503b in which the piston 504b can linearly move;
  a bearings unit 534 for rotatably supporting the mast 511 e.g., having multiple bearings and a bearings support, such as one or more support rings; and
  a transmission subsystem 530 comprising a cable 2531 wrapped around the mast 511 or via a first sheave 532 connected to the mast 511 and a second sheave 533, such that the sheaves 532,533 are rotated by the rotation of the mast 511, for pulling and pushing of the cable 531, in response to back and forth (clockwise and counterclockwise) rotation of the mast 511 caused in response to back and forth reciprocal rotation of the sail element 512.

The moveable element 501 may be connected/affixed to one end of the cable 531, such that the movable element 501 can be pulled upwardly by the cable 531 based on sail element 512 and mast 511 rotation at any rotation direction, and pushed downwardly due to the weight applied by the moveable element 501 located over a sloped surface.

The moveable element 501 may be connected to upper edges of the pistons 504a and 504b, at a lower end thereof, such that when the moveable element 501 is pulled upwardly along the slopes base part 52 by the cable 531 in response to the rotation movements of the sail element 212, the moveable element 501 linearly pulls the pistons 504a and 504b upwards out from their piston housings 503a and 503b filling the piston devices 505A and 505B. The moveable element 501 is then retracted down the slope, due to its weight (by gravity) thereby linearly pushing the pistons 504a and 504b downwards into their piston housings 503a and 503b for emptying the piston devices and 505B, respectively.

According to some embodiments, the mechanical apparatus 500 may be supported by a base 50 having a horizontal base part 51 and a sloped base part 52 connected thereto, forming an angle β (alpha) in respect to a "z" axis which is parallel to the gravitational force, where axis "z" is perpendicular to a horizontal axis "x.

The angle β between the sloped base 52 and the "z" axis, may be less than 90 degrees in respect to the "z" axis (which is parallel to the gravity), to act at full extent over the moveable element 501 for retrieving/retracting it back to a full or partial downward state). The slope angle β may be preferably at a sharp angle that is less than degrees.

According to some embodiments, the back-and-forth rotation span of the sail element 512 and the mast 511 to which the sail element 511 connects, may be less than 360 degrees or between 0-270 degrees (135 at each direction: clockwise/counterclockwise).

The moveable element 501 connects at a lower edge thereof to upper edges of the pistons 504a and 504b such that when the sail element 512 and mast 511 rotate clockwise and/or counterclockwise about their rotation axis (which may be parallel to the gravity "z" axis), the moveable element 501 is pulled upwards pulling the pistons 504a and 504b such as to fill their respective piston housings 503a and 503b.

Due to the sloped positioning of the piston devices 505A and 505B and the moveable element 501, the weight of the moveable element 501 (and the weight of the pistons 504a and 504b) is pushed by gravity down the slope pushing the pistons 504a and 504b along with it in a linear downward trajectory for emptying the piston devices 505A and 505B.

According to some embodiments, the movable element(s) of the present invention may be made of any material(s) and/or configured in any manner that enables it (them) to serve as weight(s). For example, the moveable element may be made from iron, a metal alloy, cement, a tank filled with liquid such as water, etc.

Examples

Example 1 is a mechanical apparatus for conversion of kinetic energy, the mechanical apparatus comprising at least:
a sail element;
a mast connectable to the sail element, defining a main axis "z" about which the sail element and the mast are rotatable, such that when the sail element is rotated by wind, it causes rotation of the mast, and rotation of the mast rotates the sail element,
wherein the sail element and mast are limited to rotate clockwise and counterclockwise about the "z" axis together within a limited rotation span which is smaller than 360 degrees;
at least one piston device comprising a piston housing and at least one piston, linearly movable inside the piston housing;
at least one movable element connectable to an edge of the at least one piston of the at least one piston device, the at least one moveable element serving as a movable weight; and
a transmission subsystem movably connectable to the mast at one part thereof and to the at least one movable element at another part thereof, such that when the mast is rotated by the sail element in any clockwise or counterclockwise direction in respect to the "z" axis, the kinetic rotation movement of the mast is transmitted into linear movement, in a first linear trajectory, of the at least one movable element, and of the at least one piston connected thereto,
wherein the at least one moveable element and at least one piston are movable along a linear path which is angular to a plain that is perpendicular to a vector of gravitation, such that the at least one moveable element is also moveable in response to gravitational force applied thereto, at a second linear trajectory, which is opposite to the first linear trajectory, along the linear path,
wherein the rotation of the mast and sail element causes a pull of the at least one moveable element in the first linear trajectory and the weight of the at least one moveable element causes an opposite push of the at least one moveable element in an opposite second linear trajectory along the linear path, which causes reciprocal back-and forth movements of the at least one piston connected to the at least one moveable element, for filling and emptying of the piston housing of the at least one piston device, and, for creating fluid pressure, and wherein the mechanical apparatus is further configured to connect to a power generation subsystem, for conversion of fluid pressure, caused by the reciprocal movements of the at least one piston, into electrical power.

In example 2, the subject matter of example 1 may include, wherein the sail element and the mast are limited to rotate together within a limited rotation span such that a maximal rotation at each rotation direction is 135 degrees.

In example 3, the subject matter of any one or more of examples 1 to 2 may include, wherein the mechanical apparatus is configured to be positioned in a stationary manner or for being portable.

In example 4, the subject matter of any one or more of examples 1-3 may include, wherein the transmission subsystem comprises:
a cable connected to the at least one moveable element at one end thereof;
at least one first sheave having a rotatable rounded groove around which the cable is passed, wherein the at least one first sheave is located such as to have a cable part that is proximal to the mast passed therethrough;
at least one second sheave having a rotatable rounded groove around which the cable is passed, the at least one second sheave being located such as to form a non-zero angle between the first part of the cable and a second part of the cable that is attached to the at least one moveable element at an end thereof;
wherein the at least one movable element is held angularly to the first part of the cable, such that the gravitational force is applied over the at least one moveable element acting as a weight that can be lifted by upward movements of the at least one piston rigidly connected thereto and retract to a lowered open position of the at least one piston due to gravitational force applied thereover.

In example 5, the subject matter of examples 4 may include, wherein the mechanical apparatus further comprises a bearings unit comprising at least a supporting structure and multiple hearings held therein, wherein the hearings are symmetrically arranged around the mast.

In example 6 the subject matter of example 5 may include, wherein the bearings unit further comprises an inner ring configured and located to moveably hold therein the multiple bearings.

In example 7, the subject matter of any one or more of examples 1 to 6 may include, wherein the at least one piston device comprises multiple pistons movable inside a single piston housing or multiple piston devices each having a single piston and a single piston housing in which the piston is movable.

In example 8, the subject matter of any one or more of examples 1 to 7 may include, wherein the at least one movable element is made of buoy material or connects to or embedded in a buoy element to enable movement thereof by waves engaging the buoy element or the moveable device, for enabling additional conversion of wave kinetic energy.

In example 9, the subject matter of example 8 may include, wherein the mechanical apparatus further comprises one or more hinges or a gear system for moveably connecting the moveable element to the at least one piston and/or to the at least one piston housing.

In example 10, the subject matter of any one or more of examples 1 to 9*, wherein the mechanical apparatus further comprises at least one valve located in connection between the at least one piston device and the power generation subsystem for pushing of fluid from the at least one piston device to one or more hydraulic accumulators and at least one additional valve configured and located to suck fluid from one or more fluid tanks of the power generation subsystem into the at least one piston device.

In example 11, the subject matter of example 10 may include, wherein the at least one valve used for pushing of fluid to one or more hydraulic accumulators and the at least one valve used for suction of fluid from one or more fluid tanks are one or more of: charging valves, capillary valves, one-directional valves.

In example 12, the subject matter of any one or more of examples 1 to 11, wherein the power generation subsystem to which the mechanical apparatus connects, comprises one or more of: at least one fluid tank; at least one hydraulic accumulator; a hydraulic pipeline; at least one hydraulic motor; one or more pressure valves; at least one generator operatively associated with the at least one motor such that the motor is rotatable hydraulic pressure release and the at least one generator convers motor rotations into electrical power/current.

In example 13, the subject matter of any one or more of examples 1 to 12 may include, wherein the mechanical apparatus further comprises a stationary unit for supporting and/or limiting movements of the moveable element in one or more directions.

In example 14, the subject matter of example 13 may include, wherein the stationary unit comprises at least one track having protruding rims, for restricting movement of the at least one piston an/or moveable element by only enabling linear movement of the at least one piston and/or moveable element along the track; and/or at least one barrier member preventing the moveable element from being lifted and/or lowered above and/or below a certain upper and/or lower limit, respectively.

In example 15, the subject matter of any one or more of examples 1 to 14 may include, wherein the at least one piston device and the power generation subsystem are configured for using oil fluid, wherein the at least one piston is configured to enable suction of oil from at least one oil fluid tank of the power generation subsystem via a hydraulic pipeline of the power generation subsystem, wherein the at least one piston connects to the pipeline via at least one valve.

In example 16, the subject matter of any one or more of examples 1 to n15 may include, wherein the at least one piston and/or the at least one piston housing of the at least one piston device, is/are made from a metallic alloy, iron, epoxy, resin, plastic, a polymeric materials, steel, and/or stainless steel.

In example 17, the subject matter of any one or more of examples 1 to 16 may include, wherein an upper edge of the at least one moveable element connects to a lower edge of the at least one piston such that an upward movement of the moveable element causes an upward movement of the piston into the piston housing for emptying the at least one piston device, and a downward movement of the moveable element causes a downward movement of the piston out of the piston housing for filling the at least one piston device.

In example 18, the subject matter of any one or more of examples 1 to 17 may include, wherein a lower edge of the at least one moveable element connects to an upper edge of the at least one piston such that an upward movement of the moveable element causes an upward movement of the piston out of the piston housing for filling the at least one piston device, and a downward movement of the moveable element causes a downward movement of the piston into the piston housing for emptying the at least one piston device.

Example 19 is a system for converting kinetic energy, the system comprises at least:
(i) a mechanical apparatus comprising at least:
a sail element;
a mast connectable to the sail element, defining a main axis "z" about which the sail element and mast are rotatable, such that when the sail element is rotated by wind, it causes rotation of the mast and rotation of the mast rotates the sail element, wherein the sail element and mast are limited to rotate clockwise and counterclockwise about the "z" axis together within a limited rotation span which is smaller than 360 degrees;
at least one piston device comprising a piston housing and at least one piston; and
at least one movable element connectable to an edge of the at least one piston of the at least one piston device, the at least one moveable element serving as a movable weight;
(ii) a transmission subsystem movably connectable to the mast at one part thereof and to the at least one movable element at another part thereof, such that when the mast is rotated by the sail element in any clockwise or counterclockwise direction in respect to the "z" axis, the kinetic energy caused by the rotation of the mast is translatable into linear movement of the at least one movable element, in a first linear trajectory, which causes linear moving of the piston of the at least one piston device connected to the at least one moveable element along the first linear trajectory;
wherein the at least one moveable element and at least one piston are movable along a linear path which is angular to a plain that is perpendicular to a vector of gravitation, such that the at least one moveable element is also moveable in response to gravitational force applied thereto, at a second linear trajectory, which is opposite to the first linear trajectory, along the linear path,
wherein the rotation of the mast and sail element causes a pull of the at least one moveable element in the first linear trajectory and the weight of the at least one moveable element causes an opposite push of the at least one moveable element in an opposite second linear trajectory along the linear path, which causes reciprocal back-and forth movements of the at least one piston connected to the at least one moveable element, for filling and emptying of the piston housing of the at least one piston device, and, for creating fluid pressure; and
(iii) a power generation subsystem, connectable to the at least one piston device, which is configured for converting fluid pressure and/or changes in fluid pressure, caused by reciprocal movement of the at least one piston of the at least one piston device, into electrical power.

In example 20, the subject matter of example 19 may include, wherein the power generation subsystem comprises at least:
- at least one fluid tank;
- at least one hydraulic accumulator;
- a hydraulic pipeline;
- at least one hydraulic motor; and
- at least one generator operatively associated with the at least one motor such that the motor is rotatable in response to changes in hydraulic pressure, and the at least one generator is configured to convert motor rotations into electrical power/current.

In example 21, the subject matter of example 20 may include, wherein the system further comprises one or more valves.

In example 22, the subject matter of example 21 may further include, wherein at least one of the valves is located in the hydraulic pipeline connecting the at least one piston device to at least one fluid tank and/or to the at least one hydraulic accumulator.

In example 23, the subject matter of example 22 may include, wherein the at least one valve is a charging valve or a capillary valve, one-directional valve.

In example 24, the subject matter of any one or more of examples 19 to 23 may include, wherein the power generation subsystem further comprises at least one filter located and configured to filter fluid that is returned to the at least one fluid tank.

In example 25, the subject matter of any one or more of examples 19 to 24 may include, wherein the power generation subsystem further comprises:
(i) at least one sensor located and configured to sense one or more characteristics of one or more of:
- the at least one motor;
- the at least one generator;
- one or more parts of the pipeline
- the at least one fluid tank;
- the at least one accumulator;

(ii) a control unit configured to monitor and control the system based on received and analyzed sensor data from the at least one sensor.

In example 26, the subject matter of example 25 may include, wherein the at least one sensor comprises: at least one pressure detector located and configured for measuring pressure between the at least one accumulator and the motor; at least one sensor located and configured for measuring operation characteristics of the at least one motor.

In example 27, the subject matter of example 26 may include, wherein the at least one pressure detector further comprises a transmitter for transmitting data indicative of measured pressure.

In example 28, the subject matter of any one or more of examples 19 to 27 may include, wherein the sail element and mast are limited to rotate together within a limited rotation span of 0-270 degrees.

In example 29, the subject matter of any one or more of examples 19 to 28 may include, wherein the transmission subsystem comprises:
- a cable connected to the at least one moveable element at one end thereof;
- a first sheave for rotatably connecting the mast to one end of the cable in a manner that enables the cable to become wrapped around the first ring connector;
- a second sheave for forming a non-zero angle between a first part of the cable that may be wrapped over the first ring connector and another part of the cable connected at an edge thereof to the at least one moveable element, wherein the at least one movable element is held angularly to the first part of the cable, such that the gravitational force is applied over the at least one moveable element acting as a weight that can be lifted by the upward movement of the at least one piston rigidly connected thereto, wherein the length of the cable determines a range of the rotation span of the sail element and mast.

In example 30, the subject matter of example 29 may include, wherein the system further comprises a bearings unit comprising one or more bearings and/or at least one ring.

In example 31, the subject matter of any one or more of examples 19 to 30 may include, wherein the at least one piston device comprises multiple pistons movable inside a single piston housing or multiple piston devices each having a single piston and a single piston housing in which the piston is movable.

In example 32, the subject matter of any one or more of examples 19 to 31 may include, wherein the at least one movable element is made of buoy material, embedded in a buoy element, or connects to a buoy element to enable movement thereof by waves when engaging the buoy element or the moveable element, for additional conversion of wave kinetic energy.

In example 33, the subject matter of any one or more of examples 19 to 32 may include, wherein the system further comprises one or more valves for improved flow control.

In example 32, the subject matter of any one or more of examples 19 to 33, wherein the one or more valves comprising one or more of:
- a charging valve located in a pipeline branch of the pipeline between the at least one piston device and the fluid tank;
- at least one charging valve located in a different pipeline branch of the pipeline, between the at least one piston device and the at least one hydraulic accumulator;
- at least one first non-return valve located between the at least one fluid tank and the at least one motor;
- at least one controllable valve located and configured to regulate pressure of fluid entering the at least one motor from the at least one hydraulic accumulator.

In example 35, the subject matter of any one or more of examples 19 to 34 may include, wherein the at least one piston device and the power generation subsystem are configured for using oil fluid, wherein the at least one piston is configured to enable suction of oil from at least one oil fluid tank of the power generation subsystem via a hydraulic pipeline of the power generation subsystem, wherein the at least one piston connects to the pipeline via at least one valve.

In example 36, the subject matter of any one or more of examples 19 to 35 may include, wherein the mechanical apparatus further comprises at least one track along or inside which the at least one moveable element can move, for preventing the at least one moveable element from swinging in undesired directions.

In example 37, the subject matter of any one or more of examples 19 to 36 may include, wherein an upper edge of the at least one moveable element connects to a lower edge of the at least one piston such that an upward movement of the moveable element causes an upward movement of the piston into the piston housing for emptying the at least one piston device, and a downward movement of the moveable element causes a downward movement of the piston out of the piston housing for filling the at least one piston device.

In example 38, the subject matter of any one or more of examples 19 to 37 may include, wherein a lower edge of the at least one moveable element connects to an upper edge of the at least one piston such that an upward movement of the moveable element causes an upward movement of the piston out of the piston housing for filling the at least one piston device, and a downward movement of the moveable element causes a downward movement of the piston into the piston housing for emptying the at least one piston device.

Example 39 is a method for conversion of kinetic energy into electrical power, the method comprising at least:
  providing a system for conversion of kinetic energy into electrical power comprising at least a mechanical apparatus that comprises at least a sail element, a mast connected to the sail element, at least one piston device, at least one moveable element connected to and edge of at least one piston of the at least one piston device for linearly moving thereof, and a transmission subsystem configured to transmit rotation motions of the mast into linear movements of the at least one piston and the at least one moveable element connected thereto;
  pumping fluid from at least one fluid tank into at least one hydraulic accumulator, by using the at least one piston device of the mechanical apparatus, operably at least by wind power rotating the sail element, wherein the at least one piston device is directly or indirectly hydraulically connected to the at least one fluid tank and to the at least one hydraulic accumulator; and
  converting fluid pressure generated in the at least one hydraulic accumulator to generate electrical power, by use of a power generation subsystem, configured for conversion of fluid pressure into electricity,
  wherein the at least one moveable element and at least one piston are movable along a linear trajectory which is angular to a plain that is perpendicular to a vector of gravitation, such that the at least one moveable element is also moveable in response to gravitational force applied thereto, at a second linear trajectory, which is opposite to the first linear trajectory, along the linear trajectory,
  wherein the rotation of the mast and sail element causes a pull of the at least one moveable element in a first linear trajectory and the weight of the at least one moveable element causing an opposite push of the at least one moveable element in a second opposite linear direction along the trajectory, which causes reciprocal back-and forth movements of the at least one piston, connected to the at least one moveable element, for filling and emptying of the piston housing of the at least one piston device, and, for creating fluid pressure.

In example 40, the subject matter of example 39 may include, wherein the rotation span is between 0-270 degrees.

In example 41, the subject matter of any one or more of examples 39 to 40 may include, wherein the method further comprises automatically and/or manually monitoring and controlling operation of the system, based on data from one or more sensors embedded in the system and/or manually connectable and/or approachable to the system, using a controller.

Although the above description discloses a limited number of exemplary embodiments of the invention, these embodiments should not apply any limitation to the scope of the invention, but rather be considered as exemplifications of some of the manners in which the invention can be implemented.

The method and/or processes described herein may be implemented by any one or more software, and/or hardware, element apparatus, device, apparatus, electronic and/or digital computerized system, unit, processing module, device, machine, motor, etc.

The system, module, unit, device, etc., or parts thereof, may be programmed to perform particular functions pursuant to computer readable and executable instructions, rules, conditions etc. from programmable hardware and/or software-based execution modules that may implement one or more methods or processes disclosed herein, and therefore can, in effect, considered as disclosing a "special purpose computer" particular to embodiments of each disclosed method/process.

Additionally or alternatively, the methods and/or processes disclosed herein may be implemented as a computer program that may be tangibly or intangibly embodied by a special purpose computer readable signal medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer or machine-readable storage device and that can communicate, propagate, or transport a program for use by or in connection with apparatuses, systems, platforms, methods, operations and/or processes discussed herein.

The terms "non-transitory computer-readable storage device" and "non-transitory machine-readable storage device" may also include distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by one or more communication networks.

The computer readable and executable instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

A module, a device, an apparatus, a unit and or a subsystem may each comprise a machine or machines executable instructions (e.g. commands). A module may be embodied by a circuit or a controller programmed to cause the system to implement the method, process and/or operation as disclosed herein. For example, a module may be implemented as a hardware circuit comprising, e.g., custom very large-scale integration (VLSI) circuits or gate arrays, an application-specific integrated circuit (ASIC), off-the-shelf semiconductors such as logic chips, transistors, and/or other discrete components. A module may also be implemented in programmable hardware devices such as field programmable gate arrays, programmable array logic, programmable logic devices and/or the like.

In the above disclosure, unless otherwise stated, terms such as "substantially", "about", approximately, etc., that specify a condition or relationship characterizing a feature or features of an embodiment of the invention, are to be understood to mean that the condition or characteristic is defined to within tolerances that are acceptable for operation of the embodiment for an application for which it is intended.

It is important to note that the methods/processes and/or systems/devices/subsystems/apparatuses etc., disclosed in the above Specification, are not to be limited strictly to flowcharts and/or diagrams provided in the Drawings. For example, a method may include additional or fewer processes or steps in comparison to what is described in the figures. In addition, embodiments of the method are not necessarily limited to the chronological order as illustrated and described herein.

It is noted that terms such as "processing", "computing", "calculating", "determining", "establishing", "analyzing", "checking", "estimating", "deriving", "selecting", "inferring", identifying", "detecting" and/or the like, may refer to operation(s) and/or process(es) of a computer, a computing platform, a computing system, or other electronic computing device(s), that manipulate and/or transform data represented as physical (e.g., electronic or optical signal) quantities within the computer's registers and/or memories into other data similarly represented as physical quantities within the computer's registers and/or memories or other information storage medium that may store instructions to perform operations and/or processes.

Terms used in the singular shall also include a plural scope, except where expressly otherwise stated or where the context otherwise requires.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Unless otherwise stated, the use of the expression "and/or" between the last two members of a list of options for selection indicates that a selection of one or more of the listed options is appropriate and may be made i.e. enabling all possible combinations of one or more of the specified options. Further, the use of the expression "and/or" may be used interchangeably with the expressions "at least one of the following", "any one of the following" or "one or more of the following", followed by a listing of the various options.

It is appreciated that certain features of the invention, which are, for clarity, described in the context of separate embodiments or example, may also be provided in combination in a single embodiment. Conversely, various features of the invention, which are, for brevity, described in the context of a single embodiment, example and/or option, may also be provided separately or in any suitable sub-combination or as suitable in any other described embodiment, example or option of the invention. Certain features described in the context of various embodiments, examples and/or optional implementation are not to be considered essential features of those embodiments, unless the embodiment, example and/or optional implementation is inoperative without those elements.

It is noted that the terms "in some embodiments", "according to some embodiments", "according to some embodiments of the invention", "for example", "e.g.", "for instance" and "optionally" may herein be used interchangeably.

The number of elements shown in the Figures should by no means be construed as limiting and is for illustrative purposes only.

It is noted that the terms "operable to" can encompass the meaning of the term "modified or configured to". In other words, a machine "operable to" perform a task can in some embodiments, embrace a mere capability (e.g., "modified") to perform the function and, in some other embodiments, a machine that is actually made (e.g., "configured") to perform the function.

Throughout this application, various embodiments may be presented in and/or relate to a range format. It should be understood that the description in range format is merely for convenience and brevity and should not be construed as an inflexible limitation on the scope of the embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6. from 3 to 6 etc., as well as individual numbers within that range, for example, 1, 2, 3, 4, 5, and 6. This applies regardless of the breadth of the range.

The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The invention claimed is:

1. A mechanical apparatus for conversion of kinetic energy, the mechanical apparatus comprising at least:
   a sail element;
   a mast connectable to the sail element, defining a main axis "z" about which the sail element and the mast are rotatable, such that when the sail element is rotated by wind, it causes rotation of the mast, and rotation of the mast rotates the sail element,
   wherein the sail element and mast are limited to rotate clockwise and counterclockwise about the "z" axis together within a limited rotation span which is smaller than 360 degrees;
   at least one piston device comprising a piston housing and at least one piston, linearly movable inside the piston housing;
   at least one movable element connectable to an edge of the at least one piston of the at least one piston device, the at least one moveable element serving as a movable weight; and
   a transmission subsystem movably connectable to the mast at one part thereof and to the at least one movable element at another part thereof, such that when the mast is rotated by the sail element in any clockwise or counterclockwise direction in respect to the "z" axis, the kinetic rotation movement of the mast is translatable into linear movement, in a first linear trajectory, of the at least one movable element, and of the at least one piston connected thereto,
   wherein the at least one moveable element and at least one piston are movable back and forth along a linear path, which is angular to a plane that is perpendicular to a vector of gravitation, such that the at least one moveable element is also moveable in response to gravitational force applied thereto, along a second linear trajectory along the linear path, which is opposite to the first linear trajectory,
   wherein the rotation of the mast and sail element causes a pull of the at least one moveable element in the first linear trajectory and the weight of the at least one moveable element causes an opposite push of the at least one moveable element in the second linear trajectory along the linear path, which causes reciprocal back-and-forth movements of the at least one piston connected to the at least one moveable element, for filling and emptying of the piston housing of the at least one piston device, for creating fluid pressure, wherein the mechanical apparatus is further configured to connect to a power generation subsystem, for conversion of fluid pressure, caused by the reciprocal movements of the at least one piston, into electrical power, and wherein the transmission subsystem comprises:

a cable connected to the at least one moveable element at one end thereof and to the mast at another end thereof, where the connection to the mast is such as to enable the cable to be wrapped around the mast:

at least one sheave, having a rotatable rounded groove around which the cable is passed, the at last one sheave being located such as to form a non-zero angle between a first part of the cable and a second part of the cable that is attached to the at least one moveable element at an end thereof, wherein the at least one movable element is held angularly to the first part of the cable, such that the gravitational force is applied over the at least one moveable element acting as a weight that can be lifted and lowered to lift and lower the at least one piston along the linear path for filling and emptying of the at least one piston housing.

2. The mechanical apparatus of claim 1, wherein the sail element and the mast are limited to rotate together within a limited rotation span such that a maximal rotation at each rotation direction is 135 degrees.

3. The mechanical apparatus of claim 1, wherein the at least one sheave comprises:

at least one first sheave having a rotatable rounded groove around which the cable is passed, wherein the at least one first sheave is located such as to have a cable part that is proximal to the mast passed therethrough;

at least one second sheave having a rotatable rounded groove around which the cable is passed, the at least one second sheave being located such as to form a non-zero angle between the first part of the cable and a second part of the cable that is attached to the at least one moveable element at an end thereof; wherein the at least one movable element is held angularly to the first part of the cable, such that the gravitational force is applied over the at least one moveable element acting as a weight that can be lifted by upward movements of the at least one piston rigidly connected thereto and retract to a lowered open position of the at least one piston due to gravitational force applied thereover.

4. The mechanical apparatus of claim 3 further comprising a bearings unit comprising at least a supporting structure and multiple bearings held therein, wherein the bearings are symmetrically arranged around the mast, and/or wherein the at least one piston device comprises multiple pistons movable inside a single piston housing or multiple piston devices each having a single piston and a single piston housing in which the piston is movable.

5. The mechanical apparatus of claim 1, wherein the at least one movable element is made of buoy material or connects to or embedded in a buoy element to enable movement thereof by waves engaging the buoy element or the moveable device, for enabling additional conversion of wave kinetic energy.

6. The mechanical apparatus of claim 1 further comprising one or more hinges or a gear system for moveably connecting the moveable element to the at least one piston and/or to the at least one piston housing.

7. The mechanical apparatus of claim 1 further comprising at least one valve located in connection between the at least one piston device and the power generation subsystem for pushing of fluid from the at least one piston device to one or more hydraulic accumulators and at least one additional valve configured and located to suck fluid from one or more fluid tanks of the power generation subsystem into the at least one piston device, wherein the at least one valve used for pushing of fluid to one or more hydraulic accumulators and the at least one valve used for suction of fluid from one or more fluid tanks are one or more of: charging valves, capillary valves, one-directional valves.

8. The mechanical apparatus of claim 1, wherein the power generation subsystem to which the mechanical apparatus connects, comprises one or more of:

at least one fluid tank;
at least one hydraulic accumulator;
a hydraulic pipeline;
at least one hydraulic motor; one or more pressure valves;
at least one generator operatively associated with the at least one motor such that the motor is rotatable hydraulic pressure release and the at least one generator convers motor rotations into electrical power/current.

9. The mechanical apparatus of claim 1 further comprising a stationary unit for supporting and/or limiting movements of the moveable element in one or more directions, wherein the stationary unit comprises at least one track having protruding rims, for restricting movement of the at least one piston an/or moveable element by only enabling movement of the at least one piston and/or moveable element along a linear trajectory of the track; and/or at least one barrier member preventing the moveable element from being lifted and/or lowered above and/or below a certain upper and/or lower limit, respectively.

10. The mechanical apparatus of claim 1, wherein the at least one piston device and the power generation subsystem are configured for using oil fluid, wherein the at least one piston is configured to enable suction of oil from at least one oil fluid tank of the power generation subsystem via a hydraulic pipeline of the power generation subsystem, wherein the at least one piston connects to the pipeline via at least one valve.

11. The mechanical mechanism of claim 1, wherein an upper edge of the at least one moveable element connects to a lower edge of the at least one piston such that an upward movement of the moveable element causes an upward movement of the piston into the piston housing for emptying the at least one piston device, and a downward movement of the moveable element causes a downward movement of the piston out of the piston housing for filling the at least one piston device; and/or wherein a lower edge of the at least one moveable element connects to an upper edge of the at least one piston such that an upward movement of the moveable element causes an upward movement of the piston out of the piston housing for filling the at least one piston device, and a downward movement of the moveable element causes a downward movement of the piston into the piston housing for emptying the at least one piston device.

12. A system for converting kinetic energy, the system comprising at least:

(i) a mechanical apparatus comprising at least:
a sail element;
a mast connectable to the sail element, defining a main axis "z" about which the sail element and mast are rotatable, such that when the sail element is rotated by wind, it causes rotation of the mast and rotation of the mast rotates the sail element, wherein the sail element and mast are limited to rotate clockwise and counterclockwise about the "z" axis together within a limited rotation span which is smaller than 360 degrees:
at least one piston device comprising a piston housing and at least one piston; and
at least one movable element connectable to an edge of the at least one piston of the at least one piston device, the at least one moveable element serving as a movable weight;
(ii) a transmission subsystem movably connectable to the mast at one part thereof and to the at least one movable element at another part thereof, such that when the mast is rotated by the sail element in any clockwise or counterclockwise direction in respect to the "z" axis, the kinetic energy caused by the rotation of the mast is translatable into linear movement of the at least one movable element, in a first linear trajectory, which causes linear moving of the piston of the at least one piston device connected to the at least one moveable element, along the first linear trajectory, wherein the at least one moveable element and at least one piston are movable along a linear path which is angular to a plane that is perpendicular to a vector of gravitation, such that the at least one moveable element is also moveable in response to gravitational force applied thereto, at a second linear trajectory, which is opposite to the first linear trajectory, along the linear path, wherein the rotation of the mast and sail element causes a pull of the at least one moveable element in the rust linear trajectory and the weight of the at least one moveable element causes an opposite push of the at least one moveable element in an opposite second linear trajectory along the linear path, which causes reciprocal back-and forth movements of the at least one piston connected to the at least one moveable element, for filling and emptying of the piston housing of the at least one piston device, and, for creating fluid pressure; and
(iii) a power generation subsystem, connectable to the at least one piston device, which is configured for converting fluid pressure and/or changes in fluid pressure, caused by reciprocal movement of the at least one piston of the at least one piston device, into electrical power,
wherein the transmission subsystem comprises:
a cable connected to the at least one moveable element at one end thereof and to the mast at another end thereof, where the connection to the mast is such as to enable the cable to be wrapped around the mast:
at least one sheave, having a rotatable rounded groove around which the cable is passed, the at least one sheave being located such as to form a non-zero angle between a first part of the cable and a second part of the cable that is attached to the at least one moveable element at an end thereof,
wherein the at least one movable element is held angularly to the first part of the cable, such that the gravitational force is applied over the at least one moveable element acting as a weight that can be lifted and lowered to lift and lower the at least one piston along the linear path for filling and emptying of the at least one piston housing.
13. The system of claim 12 further comprises at least one of:

at least one fluid tank;
at least one hydraulic accumulator;
a hydraulic pipeline:
at least one hydraulic motor; and
at least one generator operatively associated with the at least one motor such that the motor is rotatable in response to changes in hydraulic pressure, and the at least one generator is configured to convert motor rotations into electrical power/current; and/or,
one or more valves, wherein at least one of the valves is located in the hydraulic pipeline connecting the at least one piston device to at least one fluid tank and/or to the at least one hydraulic accumulator.
14. The system of claim 12, wherein the power generation subsystem further comprises one or more of:
at least one filter located and configured to filter fluid that is returned to the at least one fluid tank;
at least one sensor located and configured to sense one or more characteristics of one or more of: the at least one motor; the at least one generator, one or more parts of the pipeline; the at least one fluid tank; the at least one accumulator, and
a control unit configured to monitor and control the system based on received and analyzed sensor data from the at least one sensor.
15. The system of claim 12, wherein the at least one sheave comprises:
a first sheave for rotatably connecting the mast to one end of the cable in a manner that enables the cable to become wrapped around the first ring connector;
a second sheave for forming a non-zero angle between a first part of the cable wrappable over the first ring connector and another part of the cable connected at an edge thereof to the at least one moveable element, wherein the at least one movable element is held angularly to the first part of the cable, such that the gravitational force is applied over the at least one moveable element acting as a weight that can be lifted by the upward movement of the at least one piston rigidly connected thereto, wherein the length of the cable determines a range of the rotation span of the sail element and mast.
16. The system of claim 12, wherein an upper edge of the at least one moveable element connects to a lower edge of the at least one piston such that an upward movement of the moveable element causes an upward movement of the piston into the piston housing for emptying the at least one piston device, and a downward movement of the moveable element causes a downward movement of the piston out of the piston housing for filling the at least one piston device; and/or wherein a lower edge of the at least one moveable element connects to an upper edge of the at least one piston such that an upward movement of the moveable element causes an upward movement of the piston out of the piston housing for filling the at least one piston device, and a downward movement of the moveable element causes a downward movement of the piston into the piston housing for emptying the at least one piston device.
17. A method for conversion of kinetic energy into electrical power, the method comprising at least:
providing a system for conversion of kinetic energy into electrical power comprising at least a mechanical apparatus that comprises at least a sail element, a mast connected to the sail element, at least one piston device, at least one moveable element connected to an edge of at least one piston of the at least one piston device for linearly moving thereof, the at least one moveable element serving as a moveable weight, and a transmission subsystem configured to transmit rotation motions of the mast into linear movements of the at least one piston and the at least one moveable element connected thereto;

pumping fluid from at least one fluid tank into at least one hydraulic accumulator, by using the at least one piston device of the mechanical apparatus, operably at least by wind power rotating the sail element, wherein the at least one piston device is directly or indirectly hydraulically connected to the at least one fluid tank and to the at least one hydraulic accumulator; and converting fluid pressure generated in the at least one hydraulic accumulator to generate electrical power, by use of a power generation subsystem, configured for conversion of fluid pressure into electricity, wherein the at least one moveable element and at least one piston are movable along a linear trajectory which is angular to a plane that is perpendicular to a vector of gravitation, such that the at least one moveable element is also moveable in response to gravitational force applied thereto, at a second linear trajectory, which is opposite to the first linear trajectory, along the linear trajectory, wherein the rotation of the mast and sail element causes a pull of the at least one moveable element in a first linear trajectory and the weight of the at least one moveable element causing an opposite push of the at least one moveable element in a second opposite linear direction along the trajectory, which causes reciprocal back- and forth movements of the at least one piston, connected to the at least one moveable element, for filling and emptying of the piston housing of the at least one piston device, and, for creating fluid pressure, wherein the transmission subsystem comprises:
a cable connected to the at least one moveable element at one end thereof and to the mast at another end thereof, where the connection to the mast is such as to enable the cable to be wrapped around the mast:

at least one sheave, having a rotatable rounded groove around which the cable is passed, the at least one sheave being located such as to form a non-zero angle between a first part of the cable and a second part of the cable that is attached to the at least one moveable element at an end thereof, wherein the at least one movable element is held angularly to the first part of the cable, such that the gravitational force is applied over the at least one moveable element acting as a weight that can be lifted and lowered to lift and lower the at least one piston along the linear path for filling and emptying of the at least one piston housing.

18. A mechanical apparatus for conversion of kinetic energy, the mechanical apparatus comprising at least:

at least one piston device comprising a piston housing and at least one piston, linearly movable inside the piston housing;

at least one movable element connectable to an edge of the at least one piston of the at least one piston device, the at least one moveable element serving as a movable weight; and a transmission subsystem movably connectable, at one part thereof to a mast, which is connected to a sail element, and at another part thereof to the at least one movable element, such that rotations of the mast are translatable by the transmission subsystem into reciprocal back and forth movements of the at least one moveable element along a linear path, wherein the transmission subsystem comprises:
a cable connected to the at least one moveable element at one end thereof and to the mast at another end thereof, where the connection to the mast is such as to enable the cable to be wrapped around the mast;

at least one sheave, having a rotatable rounded groove around which the cable is passed, the at least one sheave being located such as to form a non-zero angle between a first part of the cable and a second part of the cable that is attached to the at least one moveable element at an end thereof, wherein the at least one movable element is held angularly to the first part of the cable, such that the gravitational force is applied over the at least one moveable element acting as a weight that can be lifted and lowered to lift and lower the at least one piston along the linear path for filling and emptying of the at least one piston housing.

* * * * *